US009141117B2

(12) United States Patent
Shen et al.

(10) Patent No.: US 9,141,117 B2
(45) Date of Patent: Sep. 22, 2015

(54) THERMAL CONTROL OF MULTIPLE DEVICES

(75) Inventors: Stephen L. Shen, Canton, MI (US); Keith D. Buford, Southfield, MI (US)

(73) Assignee: GM GLOBAL TECHNOLOGY OPERATIONS LLC, Detroit, MI (US)

(*) Notice: Subject to any disclaimer, the term of this patent is extended or adjusted under 35 U.S.C. 154(b) by 483 days.

(21) Appl. No.: 13/100,850

(22) Filed: May 4, 2011

(65) Prior Publication Data

US 2012/0283898 A1 Nov. 8, 2012

(51) Int. Cl.
*G05D 23/00* (2006.01)
*G05D 23/19* (2006.01)
*H01M 10/625* (2014.01)
*H01M 10/633* (2014.01)
*H01M 10/613* (2014.01)

(52) U.S. Cl.
CPC ......... *G05D 23/1932* (2013.01); *H01M 10/613* (2015.04); *H01M 10/625* (2015.04); *H01M 10/633* (2015.04)

(58) Field of Classification Search
CPC ........ B60K 11/08; B60K 11/04; B60K 11/06; B60K 11/02; F01P 11/10; H02J 7/0031; H02J 2007/004; H02J 2007/0037; Y02E 60/12; H01M 10/48; H01M 10/613; H01M 10/625; H01M 10/633; G05D 23/00; G05D 23/1932; G06F 19/00
USPC ............ 701/22; 180/65.1, 65.21, 65.2, 65.24, 180/65.22, 65.225, 65.265, 65.27, 65.275, 180/65.28, 65.285, 65.29, 65.31, 65.8, 68.1, 180/54.1, 68.2, 68.3, 68.4, 165, 65.245; 318/139; 320/134
See application file for complete search history.

(56) References Cited

U.S. PATENT DOCUMENTS

| 6,467,286 B2 * | 10/2002 | Hasebe et al. ............... 62/185 |
| 7,377,237 B2 | 5/2008 | Carney et al. |
| 7,421,301 B2 * | 9/2008 | Schulz et al. .................. 700/1 |
| 7,621,262 B2 * | 11/2009 | Zubeck ..................... 123/543 |
| 7,631,512 B2 * | 12/2009 | Smith ...................... 62/228.3 |

(Continued)

FOREIGN PATENT DOCUMENTS

| CN | 101376337 A | 3/2009 |
| CN | 101622143 A | 1/2010 |

OTHER PUBLICATIONS

State Intellectual Property Office of The Peoples' Republic of China, Office Action for Chinese Patent Application No. 201210135714.4, mailed Jan. 2, 2014.

(Continued)

*Primary Examiner* — John Q Nguyen
*Assistant Examiner* — Nadeem Odeh
(74) *Attorney, Agent, or Firm* — Ingrassia Fisher & Lorenz, P.C.

(57) ABSTRACT

Methods and systems are provided for thermally controlling a plurality of devices of a system using an element. The element is controlled in accordance with a first control strategy via a processor if a temperature of a first device of the plurality of devices is within a first range, a temperature of a second device of the plurality of devices is within a second range, and an inlet temperature of the system is within a third range. The element is controlled via the processor in accordance with a second control strategy via the processor if the temperature of the first device is not within the first range, the temperature of the second device is not within the second range, or the inlet temperature is not within the third range.

20 Claims, 4 Drawing Sheets (56) References Cited

U.S. PATENT DOCUMENTS

| | | | |
|---|---|---|---|
| 7,631,711 B2* | 12/2009 | Kubo | 180/68.1 |
| 7,789,176 B2* | 9/2010 | Zhou | 180/65.1 |
| 7,841,431 B2* | 11/2010 | Zhou | 180/65.1 |
| 7,848,902 B2* | 12/2010 | Zettel et al. | 702/136 |
| 7,900,727 B2* | 3/2011 | Shinmura | 180/68.1 |
| 7,918,296 B2* | 4/2011 | Reddy | 180/68.3 |
| 8,119,300 B2* | 2/2012 | Tsuchiya et al. | 429/434 |
| 8,395,355 B2* | 3/2013 | Kaita et al. | 320/134 |
| 8,556,011 B2* | 10/2013 | Anwar et al. | 180/65.275 |
| 2004/0069546 A1* | 4/2004 | Lou et al. | 180/65.2 |
| 2008/0251235 A1 | 10/2008 | Zhou | |
| 2009/0139781 A1* | 6/2009 | Straubel | 180/65.1 |

OTHER PUBLICATIONS

German Patent and Trade Mark Office, Office Action in German Patent Application No. 10 2012 206 539.3 mailed Sep. 29, 2014.

* cited by examiner

THERMAL CONTROL OF MULTIPLE DEVICES

TECHNICAL FIELD

The present disclosure generally relates to thermal control and, more specifically, to methods and systems for thermal control of multiple devices, such as in vehicles.

BACKGROUND

Automobiles, various other vehicles, and various other systems include devices that require thermal control. For example, a hybrid vehicle typically includes a high voltage battery, an inverter, and an accessory power module (APM) that may require thermal control using an element, such as a fan. Often, in such situations in which multiple devices are controlled by a common element, the element is controlled based on the device requiring the most thermal control, such as the device requiring the most cooling at a particular point in time. However, such existing control strategies may not always provide optimal thermal control for such multiple devices.

Accordingly, it is desirable to provide improved methods for controlling multiple devices using a single element, such as a fan, for example for use in hybrid vehicles. It is also desirable to provide improved program products and systems for controlling multiple devices using a single element, such as a fan, for example for use in hybrid vehicle. Furthermore, other desirable features and characteristics of the present invention will be apparent from the subsequent detailed description and the appended claims, taken in conjunction with the accompanying drawings and the foregoing technical field and background.

SUMMARY

In accordance with an exemplary embodiment, a method for thermally controlling a plurality of devices of a system using an element is provided. The method comprises the steps of controlling the element in accordance with a first control strategy via a processor if a temperature of a first device of the plurality of devices is within a first range, a temperature of a second device of the plurality of devices is within a second range, and an inlet temperature of the system is within a third range, and controlling the element via the processor in accordance with a second control strategy via the processor if the temperature of the first device is not within the first range, the temperature of the second device is not within the second range, or the inlet temperature is not within the third range.

In accordance with another exemplary embodiment, a program product for thermally controlling a plurality of devices of a system using an element is provided. The program product comprises a program and a non-transitory, computer-readable storage medium. The program is configured to control the element in accordance with a first control strategy if a temperature of a first device of the plurality of devices is within a first range, a temperature of a second device of the plurality of devices is within a second range, and an inlet temperature of the system is within a third range, and control the element in accordance with a second control strategy if the temperature of the first device is not within the first range, the temperature of the second device is not within the second range, or the inlet temperature is not within the third range. The non-transitory computer readable storage medium stores the program.

In accordance with a further exemplary embodiment, a system for thermally controlling a plurality of devices of a second system using an element is provided. The system comprises a first sensor, a second sensor, and a processor. The first sensor is configured to measure a temperature of a first device of the plurality of devices. The second sensor is configured to measure a temperature of a second device of the plurality of devices. The third sensor is configured to measure an inlet temperature of the second system. The processor is coupled to the first sensor, the second sensor, and the third sensor. The processor is configured to control the element in accordance with a first control strategy if the temperature of the first devices is within a first range, the temperature of the second device is within a second range, and the inlet temperature is within a third range, and control the element in accordance with a second control strategy if the temperature of the first device is not within the first range, the temperature of the second device is not within the second range, or the inlet temperature is not within the third range.

BRIEF DESCRIPTION OF THE DRAWINGS

The present disclosure will hereinafter be described in conjunction with the following drawing figures, wherein like numerals denote like elements, and wherein.

DETAILED DESCRIPTION

The following detailed description is merely exemplary in nature and is not intended to limit the disclosure or the application and uses thereof. Furthermore, there is no intention to be bound by any theory presented in the preceding background or the following detailed description.

Figure 1:
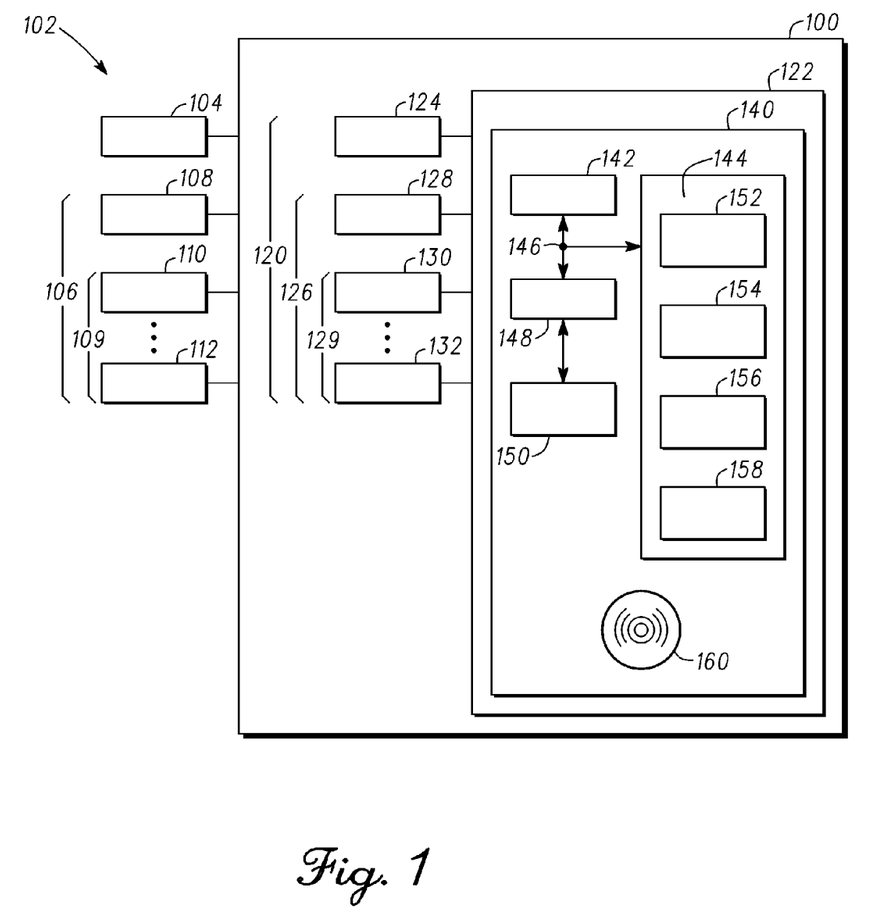
FIG. 1 is a functional block diagram of a system for thermally controlling multiple devices, for example for a vehicle such as an automobile, in accordance with an exemplary embodiment.

FIG. 1 is a functional block diagram of a system 100. The system 100 comprises a thermal control system, and is configured to thermally control multiple devices 106 of a second system 102 using an element 104, in accordance with an exemplary embodiment. Specifically, the system 100 utilizes different control strategies for operating the element 104 at different levels, based on various conditions comprising an inlet temperature and temperatures of the multiple devices 106. The system 100 thereby thermally controls the multiple devices using the single element 104 in accordance with different strategies based upon these conditions.

The system 100, the multiple devices 106, the element 104, and/or the second system 102 may also be part of a single (for example, larger) system. In certain embodiments, the system 100 is for use in a vehicle. In certain embodiments, the vehicle comprises an automobile, such as a sedan, a sport utility vehicle, a van, or a truck. In one preferred embodiment, the system 100 is for use in a hybrid vehicle. However, the system 100 may also be used in various other types of vehicles, and in various other types of systems and devices.

The element 104 comprises a thermal control element that can be used to thermally control the temperature of the devices 106, for example via heating and cooling. In one preferred embodiment, the element 104 comprises a fan. As depicted in FIG. 1, the devices 106 include a first device 108 and one or more additional devices 109. In one preferred embodiment in which the system 100 is used in a hybrid vehicle, the first device 108 comprises a high voltage battery for the hybrid vehicle, and the additional devices 109 comprise one or more power electronic devices for the hybrid vehicle. In one preferred embodiment, the additional devices 109 comprise two power electronic devices, namely, an inverter 110 and an accessory power module (APM) 112. The number of additional devices 109 may vary, as may the number of various other components of the systems 100, 102 of FIG. 1.

The system 100 is coupled to the element 104 and to the devices 106. The system 100 includes sensors 120 and a controller 122. The sensors 120 are coupled to the devices 106 and to the controller 122. The sensors 120 preferably comprise a plurality of temperature sensors. Specifically, in one preferred embodiment, the sensors 120 comprise an inlet air temperature sensor 124 and various additional temperature sensors 126. The inlet air temperature sensor 124 measures an inlet air temperature of the system 102, and provides signals representing such measures and/or information pertaining thereto to the controller 122 for processing. The additional temperature sensors 126 preferably include a first device temperature sensor 128 and one or more additional device temperature sensors 129. The additional temperature sensors 126 measure temperatures of the devices 106 and provide signals representing such measures and/or information pertaining thereto to the controller 122 for processing.

In one preferred embodiment in which the system 100 is used in a hybrid vehicle, the additional temperature sensors 126 comprise a battery temperature sensor 128 that measures a temperature of the battery 108 and one or more power electronic device sensors 129 that measure temperatures of the power electronic devices 109. Also in one such embodiment, the power electronic device sensors 129 comprise an inverter temperature sensor 130 that measures a temperature of the inverter 110 and an APM sensor 132 that measures a temperature of the APM 112. Each of the sensors 120 provide their respective measured values and/or information pertaining thereto to the controller 122 for processing. The number of power electronic device sensors 129, sensors 120, and/or other components may vary.

The controller 122 is coupled to the sensors 120 and to the element 104. The controller 122 receives the measured values from the sensors 120, including the inlet temperature and the temperatures of the various devices 106. The controller 122 processes these temperature values and thermally controls the temperatures of the devices 106 via operation of the element 104. The controller 122 operates the element 104 in accordance with different control strategies, thereby resulting in different temperatures of the devices 106, depending upon the various temperature values and the processing thereof. The controller 122 preferably performs these functions in accordance with steps of the process 200 and the various steps, sub-processes, and graphical illustrations pertaining thereto in FIGS. 2-5, described further below.

As depicted in FIG. 1, the controller 122 comprises a computer system 140. In certain embodiments, the controller 122 may also include one or more of the sensors 120 and/or one or more other devices. In addition, it will be appreciated that the controller 122 may otherwise differ from the embodiment depicted in FIG. 1, for example in that the controller 122 may be coupled to or may otherwise utilize one or more remote computer systems and/or other control systems.

In the depicted embodiment, the computer system 140 is coupled to each of the sensors 120. The computer system 140 performs the functions of the controller 122, for example in receiving signals or information from the various sensors 120, processing these signals or information, and thermally controlling the devices 106. In a preferred embodiment, these and other functions are conducted in accordance with steps of the process 200 and the various steps, sub-processes, and graphical illustrations pertaining thereto in FIGS. 2-5, described further below.

In the depicted embodiment, the computer system 140 includes a processor 142, a memory 144, an interface 148, a storage device 150, and a bus 146. The processor 142 performs the computation and control functions of the computer system 140 and the controller 122, and may comprise any type of processor or multiple processors, single integrated circuits such as a microprocessor, or any suitable number of integrated circuit devices and/or circuit boards working in cooperation to accomplish the functions of a processing unit. During operation, the processor 142 executes one or more programs 152 contained within the memory 144 and, as such, controls the general operation of the controller 122 and the computer system 140, preferably in executing the steps of the processes described herein, such as the steps of the process 200 and the various steps, sub-processes, and graphical illustrations pertaining thereto in FIGS. 2-5, described further below.

The memory 144 can be any type of suitable memory. This would include the various types of dynamic random access memory (DRAM) such as SDRAM, the various types of static RAM (SRAM), and the various types of non-volatile memory (PROM, EPROM, and flash). The bus 146 serves to transmit programs, data, status and other information or signals between the various components of the computer system 140. In a preferred embodiment, the memory 144 stores the above-referenced program 152 along with one or more stored values 154, look-up tables 156, and/or control strategies 158 for use in thermally controlling the devices 106. In certain examples, the memory 144 is located on and/or co-located on the same computer chip as the processor 142.

The interface 148 allows communication to the computer system 140, for example from a system driver and/or another computer system, and can be implemented using any suitable method and apparatus. It can include one or more network interfaces to communicate with other systems or components. The interface 148 may also include one or more network interfaces to communicate with technicians, and/or one or more storage interfaces to connect to storage apparatuses, such as the storage device 150.

The storage device 150 can be any suitable type of storage apparatus, including direct access storage devices such as hard disk drives, flash systems, floppy disk drives and optical disk drives. In one exemplary embodiment, the storage device 150 comprises a program product from which memory 144 can receive a program 152 that executes one or more embodiments of one or more processes of the present disclosure, such as the process 200 and the various steps, sub-processes, and graphical illustrations pertaining thereto in FIGS. 2-5, described further below. In another exemplary embodiment, the program product may be directly stored in and/or otherwise accessed by the memory 144 and/or a disk (e.g. disk 160), such as that referenced below.

The bus 146 can be any suitable physical or logical means of connecting computer systems and components. This includes, but is not limited to, direct hard-wired connections, fiber optics, infrared and wireless bus technologies. During operation, the program 152 is stored in the memory 144 and executed by the processor 142.

It will be appreciated that while this exemplary embodiment is described in the context of a fully functioning computer system, those skilled in the art will recognize that the mechanisms of the present disclosure are capable of being distributed as a program product with one or more types of non-transitory computer-readable signal bearing media used to store the program and the instructions thereof and carry out the distribution thereof, such as a non-transitory computer readable medium bearing the program and containing computer instructions stored therein for causing a computer processor (such as the processor 142) to perform and execute the program. Such a program product may take a variety of forms, and the present disclosure applies equally regardless of the particular type of computer-readable signal bearing media used to carry out the distribution. Examples of signal bearing media include: recordable media such as floppy disks, hard drives, memory cards and optical disks, and transmission media such as digital and analog communication links. It will similarly be appreciated that the computer system 140 may also otherwise differ from the embodiment depicted in FIG. 1, for example in that the computer system 140 may be coupled to or may otherwise utilize one or more remote computer systems and/or other control systems.

Figure 2:
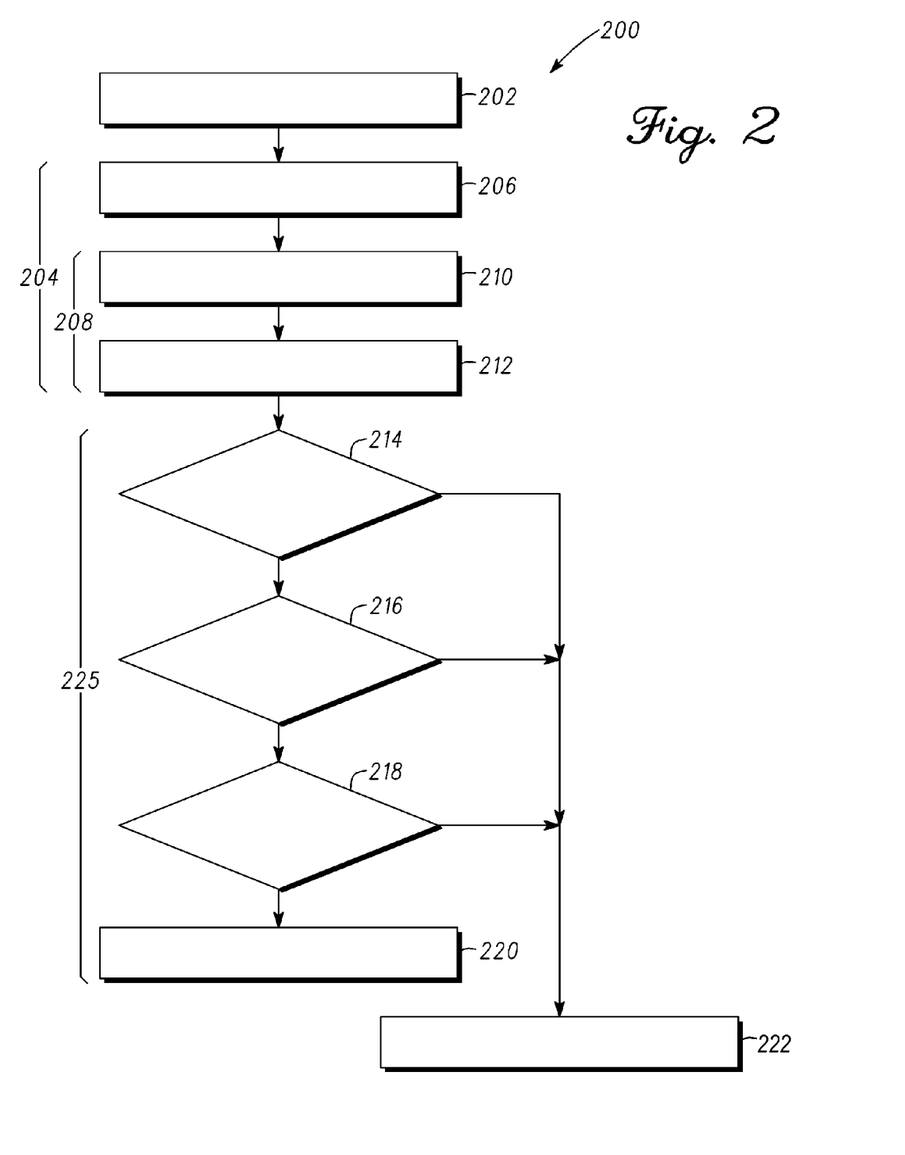
FIG. 2 is a flowchart of a process for thermally controlling multiple devices, and that can be used in connection with the system of FIG. 1, in accordance with an exemplary embodiment.

FIG. 2 is a flowchart of a process 200 for thermally controlling multiple devices, in accordance with an exemplary embodiment. The process utilizes different control strategies for thermally controlling the different devices based on various conditions comprising an inlet temperature and various temperatures of the devices. The process 200 can preferably be utilized in connection with the systems 100, 102 of FIG. 1, the element 104 of FIG. 1, the devices 106 of FIG. 1, the controller 122 of FIG. 1, and the computer system 140 of FIG. 1, in accordance with an exemplary embodiment.

As depicted in FIG. 2, the process 200 includes the step of measuring or obtaining an inlet temperature (step 202). The inlet temperature preferably comprises an inlet air temperature of a system that includes the devices to be thermally controlled. The inlet temperature preferably comprises an inlet temperature of the system 102 of FIG. 1, for example as determined between an inlet of the system (not depicted in FIG. 1) and the element 104 of FIG. 1. The inlet temperature is preferably measured by the inlet air temperature sensor 124 of FIG. 1 and provided to the controller 122, preferably to the processor 142 thereof, for processing.

Temperatures of multiple devices are also measured or obtained (step 204). Specifically, temperatures of the devices 106 of FIG. 1 are preferably measured by the additional temperature sensors 126 of FIG. 1 and provided to the controller 122, most preferably to the processor 142 thereof, for processing. In a preferred embodiment, as part of step 204, temperatures are measured or obtained for the first device 108 of FIG. 1 (step 206) and the one or more additional devices 109 of FIG. 1 (step 208). During step 206, the temperature of the first device 108 of FIG. 1 is preferably measured by sensor 128 of FIG. 1 and provided to the controller 122, most preferably to the processor 142 thereof, for processing. During step 208, the temperature of the one or more additional devices 109 of FIG. 1 are preferably measured by sensors 129 of FIG. 1 and provided to the controller 122, most preferably to the processor 142 thereof, for processing.

Specifically, in one preferred embodiment in which the process 200 is used in a hybrid vehicle, during step 206, a temperature of the battery 108 of FIG. 1 is measured by the battery temperature sensor 128 of FIG. 1 and provided to the controller 122, preferably to the processor 142 thereof, for processing. Also in one such preferred embodiment, during step 208, temperatures of one or more power electronic devices 109 of FIG. 1 are measured by sensors 129 of FIG. 1 and provided to the controller 122, preferably to the processor 142 thereof, for processing. In one such embodiment, during step 208, temperatures for the inverter 110 and the APM 112 of FIG. 1 are measured by sensors 130 and 132, respectively, of FIG. 1, and are provided to the controller 122, preferably to the processor 142 thereof, for processing, in respective sub-steps 210 and 212 of step 208.

A determination is made as to whether the inlet temperature of step 202 is within a predetermined range (step 214). Step 214 preferably comprises a determination of whether the inlet temperature is within a range of values by which an alternate control strategy is optimal for thermally controlling the devices 106 of FIG. 1 instead of in accordance with traditional control strategies. This determination is preferably made by the controller 122, most preferably by the processor 142 thereof.

If a determination is made in step 214 that the inlet temperature is within its predetermined range, then a determination is made as to whether the first device temperature of step 206 is within a predetermined range (step 216). Step 216 preferably comprises a determination of whether the first device temperature is within a range of values by which an alternate control strategy is optimal for thermally controlling the devices 106 of FIG. 1 instead of using traditional control strategies. Specifically, in one preferred embodiment in which the process 200 is used in a hybrid vehicle, step 216 comprises a determination of whether a temperature of the battery 108 of FIG. 1 is within a range of values by which an alternate control strategy is optimal for thermally controlling the devices 106 of FIG. 1 instead of using traditional control strategies. This determination is preferably made by the controller 122, most preferably by the processor 142 thereof.

If a determination is made in step 216 that the first device temperature is within its predetermined range, then a determination is made as to whether the one or more additional device temperatures of step 208 are in their predetermined ranges (step 218). Step 218 preferably comprises a determination of whether at least one of the additional device temperatures of step 208 are within a respective range of values by which an alternate control strategy is optimal for thermally controlling the devices 106 of FIG. 1 instead of using traditional control strategies. Specifically, in one preferred embodiment in which the process 200 is used in a hybrid vehicle, step 218 comprises a determination of whether (a) a temperature of the inverter 110 of FIG. 1 is within a range of values by which an alternate control strategy is optimal for thermally controlling the devices 106 of FIG. 1 instead of using traditional control strategies, or (b) a temperature of the APM 112 of FIG. 1 is within a range of values by which an alternate control strategy is optimal for thermally controlling the devices 106 of FIG. 1 instead of using traditional control strategies. This criteria are preferably satisfied for step 218 if either or both of conditions (a) or (b) described above are satisfied, that is, with respect to one or more of the power electronic devices 109 of FIG. 1. This determination is preferably made by the controller 122, most preferably by the processor 142 thereof.

If a determination is made in step 218 that at least one of the additional device temperatures is within its respective range for alternative control, then an alternative control strategy is utilized (step 220). Specifically, during step 220, the controller 122 of FIG. 1 operates the element 104 of FIG. 1 in a manner that thermally controls the temperature of the devices 106 in a different manner than under normal or standard conditions. Preferably, during step 220, the controller 122 of FIG. 1 operates the element 104 in a lesser amount (most preferably, at a lower speed) as compared with the standard control strategy described below in connection with step 222. Steps of the alternative control strategy of step 220 are preferably stored in the memory 144 of FIG. 1 as one of the control strategies 158 of FIG. 1. The alternative control strategy of step 220 may also utilize one or more look-up tables 156 of FIG. 1 stored in the memory 144, for example pertaining to operation of the element 104 of FIG. 1.

The alternative control strategy allows for temperature adjustments (for example cooling) of the additional devices 109 while reducing or minimizing any unwanted temperature adjustments of the first device 108 of FIG. 1. Specifically, in one preferred embodiment in which the process 200 is used in a hybrid vehicle, the alternative control strategy provides for a modulated (preferably reduced) adjustment of the fan 104 of FIG. 1 in order to provide required thermal control (preferably cooling) to the power electronic devices 109 of FIG. 1 (preferably, the inverter 110 and APM 112 of FIG. 1) while reducing or minimizing unwanted temperature adjustment (heating) of the battery 108 of FIG. 1.

Conversely, if a determination is made in any of steps 214-218 that any of the conditions of steps 214, 216, or step 218 are not satisfied (specifically, that the inlet temperature is not within its respective range, that the first device temperature is not within its respective range, or that all of the additional device temperatures are not within their respective ranges), then a standard control strategy is utilized (step 222). Specifically, during step 222, the controller 122 of FIG. 1 operates the element 104 of FIG. 1 in a manner that thermally controls the temperature of the devices 106 in a typical or standard manner. Preferably, during step 222, the controller 122 of FIG. 1 operates the element 104 in a greater amount (most preferably, at a faster speed) as compared with the alternative control strategy described above in connection with step 220. In one such embodiment, the standard control strategy operates the element 104 based on the largest requested speed of the element 104 provided by any of the devices 106 of FIG. 1. Steps of the standard control strategy of step 222 are preferably stored in the memory 144 of FIG. 1 as one of the control strategies 158 of FIG. 1. The standard control strategy of step 222 may also utilize one or more look-up tables 156 of FIG. 1 stored in the memory 144, for example pertaining to operation of the element 104 of FIG. 1.

As depicted in FIG. 2, the combined steps 214-222 are also referenced as a combined step or sub-process 225. The sub-process 225 refers to the processing of the various temperature values of steps 202-212 and the implementation of thermal control strategies based on these temperature values.

Figure 3:
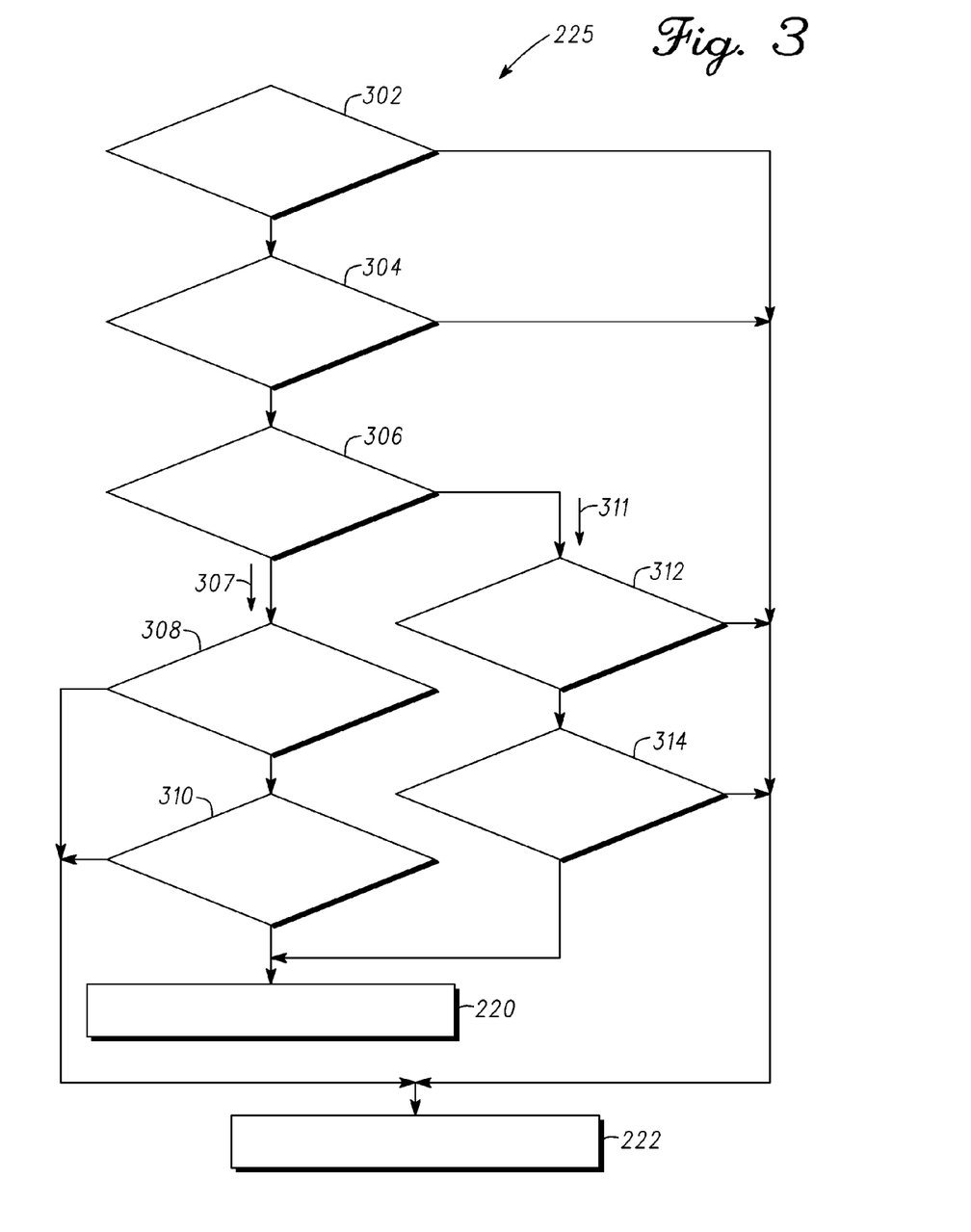
FIG. 3 is a flowchart of a sub-process of the process of FIG. 2, including a sub-process for processing various system temperature values of FIG. 2, and that can also be used in connection with the system of FIG. 1, in accordance with an exemplary embodiment.

Turning now to FIG. 3, a flowchart is provided for an exemplary embodiment of the sub-process 225 of FIG. 2. As depicted in FIG. 3, the sub-process 225 includes the step of determining whether at least one of the additional device temperatures of step 208 of FIG. 2 is greater than a predetermined threshold (step 302). The predetermined threshold of step 302 preferably represents a temperature above which the applicable device is likely to require cooling. This predetermined threshold is preferably stored in the memory 144 of FIG. 1 as one of the stored values 154 of FIG. 1. The determination of step 302 is preferably made by the controller 122 of FIG. 1, most preferably by the processor 142 thereof.

In one preferred embodiment in which the process is implemented in a hybrid vehicle, during step 302 a determination is made as to whether at least one of the power electronic devices 109 of FIG. 1 has a temperature that is greater than a respective power electronic device temperature threshold. Specifically, in one such preferred embodiment, during step 302 a determination is made as to whether (a) the inverter 110 of FIG. 1 has a temperature that is greater than an inverter temperature threshold or (b) the APM 112 of FIG. 1 has a temperature that is greater than an APM temperature threshold. In this embodiment, the condition of step 302 is deemed to be satisfied if either or both of conditions (a) and (b) above are satisfied. In one such embodiment, the inverter temperature threshold and the APM temperature threshold are both equal to approximately sixty degrees Celsius (60° C.). However, this may vary.

If a determination is made in step 302 that neither of the additional device temperatures of step 208 of FIG. 2 are greater than the respective predetermined thresholds, then the process proceeds to the above-described step 222, in which the standard thermal control strategy is utilized. Conversely, if a determination is made in step 302 that at least one of the additional device temperatures of step 208 of FIG. 2 are greater than their respective predetermined thresholds, then the process proceeds instead to step 304, described directly below.

During step 304, a determination is made as to whether the inlet temperature of step 202 of FIG. 2 is less than at least one of the additional device temperatures of step 208 of FIG. 2. The determination of step 304 is preferably made by the controller 122 of FIG. 1, most preferably by the processor 142 thereof. In one preferred embodiment in which the process is implemented in a hybrid vehicle, during step 304 a determination is made as to whether the inlet temperature is less than the temperature of at least one of the power electronic devices 109 of FIG. 1.

If a determination is made in step 304 that the inlet temperature of step 202 of FIG. 2 is greater than or equal to both of the additional device temperatures of step 208 of FIG. 2, then the process proceeds to the above-described step 222, in which the standard thermal control strategy is utilized. Conversely, if a determination is made in step 304 that the inlet temperature of step 202 of FIG. 2 is less than at least one of the additional device temperatures of step 208 of FIG. 2, then the process proceeds instead to step 306, described directly below.

During step 306, a determination is made as to whether the inlet temperature of step 202 of FIG. 2 is greater than an inlet temperature threshold. The inlet temperature threshold is preferably stored in the memory 144 of FIG. 1 as one of the stored values 154 of FIG. 1. The determination of step 306 is preferably made by the controller 122 of FIG. 1, most preferably by the processor 142 thereof. In one preferred embodiment in which the process is implemented in a hybrid vehicle, the inlet temperature threshold is equal to approximately thirty five degrees Celsius (35° C.). However, this may vary.

If a determination is made in step 306 that the inlet temperature of step 202 of FIG. 2 is greater than the inlet temperature threshold, then the process proceeds along a first path 307 (or warm temperature path), beginning with step 308, described below. Conversely, if a determination is made in step 306 that the inlet temperature of step 202 of FIG. 2 is less than or equal to the inlet temperature threshold, then the process proceeds along a second path 311 (or cool temperature path), beginning with step 312, described below.

During step 308 of the warm temperature path 307, a determination is made as to whether the first device temperature of step 206 of FIG. 2 is greater than a respective predetermined threshold. The predetermined threshold of step 308 preferably represents a temperature above which the applicable device is operating in a safe or reasonable range given the inlet air temperature. This predetermined threshold is preferably stored in the memory 144 of FIG. 1 as one of the stored values 154 of FIG. 1. The determination of step 308 is preferably made by the controller 122 of FIG. 1, most preferably by the processor 142 thereof.

In one preferred embodiment in which the process is implemented in a hybrid vehicle, during step 308 a determination is made as to whether a temperature of the battery 108 of FIG. 1 is greater than a predetermined battery temperature threshold. In one such embodiment, the predetermined battery temperature threshold is equal to approximately thirty degrees Celsius (30° C.). However, this may vary.

If a determination is made in step 308 that the first device temperature of step 206 of FIG. 2 is less than or equal to its predetermined threshold, then the process proceeds to the above-described step 222, in which the standard thermal control strategy is utilized. Conversely, if a determination is made in step 308 that the first device temperature of step 206 is greater than its predetermined threshold, then the process proceeds instead to step 310, described directly below.

During step 310, a determination is made as to whether the inlet temperature of step 202 of FIG. 2 is greater than the first device temperature of step 206 of FIG. 2. The determination of step 310 is preferably made by the controller 122 of FIG. 1, most preferably by the processor 142 thereof. In one preferred embodiment in which the process is implemented in a hybrid vehicle, during step 310 a determination is made as to whether the inlet temperature is greater than the temperature of the battery 108 of FIG. 1.

If a determination is made in step 310 that the inlet temperature of step 202 of FIG. 2 is less than or equal to the first device temperature of step 206 of FIG. 2, then the process proceeds to the above-described step 222, in which the standard thermal control strategy is utilized. Conversely, if a determination is made in step 310 that the inlet temperature of step 202 of FIG. 2 is greater than the first device temperature of step 206 of FIG. 2, then the process proceeds instead to the above-described step 220, in which the alternative control strategy is utilized.

With reference now to the cool temperature path 311, during step 312 of the cool temperature path 311, a determination is made as to whether the first device temperature of step 206 of FIG. 2 is less than a respective predetermined threshold. The determination of step 312 is preferably made by the controller 122 of FIG. 1, most preferably by the processor 142 thereof.

In one preferred embodiment in which the process is implemented in a hybrid vehicle, during step 312 a determination is made as to whether a temperature of the battery 108 of FIG. 1 is less than a predetermined battery temperature threshold. The predetermined threshold of step 312 preferably represents a temperature above which the applicable device is operating in a safe or reasonable range given the inlet air temperature. This predetermined threshold is preferably stored in the memory 144 of FIG. 1 as one of the stored values 154 of FIG. 1. In one such embodiment, the predetermined battery temperature threshold is equal to the battery threshold of step 308, and is most preferably equal to approximately thirty degrees Celsius (30° C.). However, this may vary.

If a determination is made in step 312 that the first device temperature of step 206 of FIG. 2 is greater than or equal to its predetermined threshold, then the process proceeds to the above-described step 222, in which the standard thermal control strategy is utilized. Conversely, if a determination is made in step 312 that the first device temperature of step 206 is less than its predetermined threshold, then the process proceeds instead to step 314, described directly below.

During step 314, a determination is made as to whether the inlet temperature of step 202 of FIG. 2 is less than the first device temperature of step 206 of FIG. 2. The determination of step 314 is preferably made by the controller 122 of FIG. 1, most preferably by the processor 142 thereof. In one preferred embodiment in which the process is implemented in a hybrid vehicle, during step 314 a determination is made as to whether the inlet temperature is less than the temperature of the battery 108 of FIG. 1.

If a determination is made in step 314 that the inlet temperature of step 202 of FIG. 2 is greater than or equal to the first device temperature of step 206 of FIG. 2, then the process proceeds to the above-described step 222, in which the standard thermal control strategy is utilized. Conversely, if a determination is made in step 314 that the inlet temperature of step 202 of FIG. 2 is less than the first device temperature of step 206 of FIG. 2, then the process proceeds instead to the above-described step 220, in which the alternative control strategy is utilized.

The process 200 of FIGS. 2 and 3 and the sub-process 225 of FIG. 3 provide improved thermal control of the various devices 106 of FIG. 1 with a single element 104 of FIG. 1. For example, in one embodiment in which the element 104 of FIG. 1 comprises a fan, if the first device 106 of FIG. 1 is above an optimal temperature level but is still within safe or reasonable temperature limits, while one or more of the additional devices 109 of FIG. 1 require cooling, the element (fan) 104 of FIG. 1 may be operated in accordance with the alternative control strategy of step 220, but at a slower speed as compared with the standard control strategy of step 222. For example, in one preferred embodiment in which the process 200 is utilized in a hybrid vehicle, during step 220 the alternative control strategy provides the power electronic devices 109 of FIG. 1 with required downward temperature adjustments, while providing relative modest upward temperature adjustments for the battery 108 of FIG. 1 (as compared with the standard control strategy of step 222), so that the temperature of the battery 108 remains within a safe and reasonable range.

Figure 4:
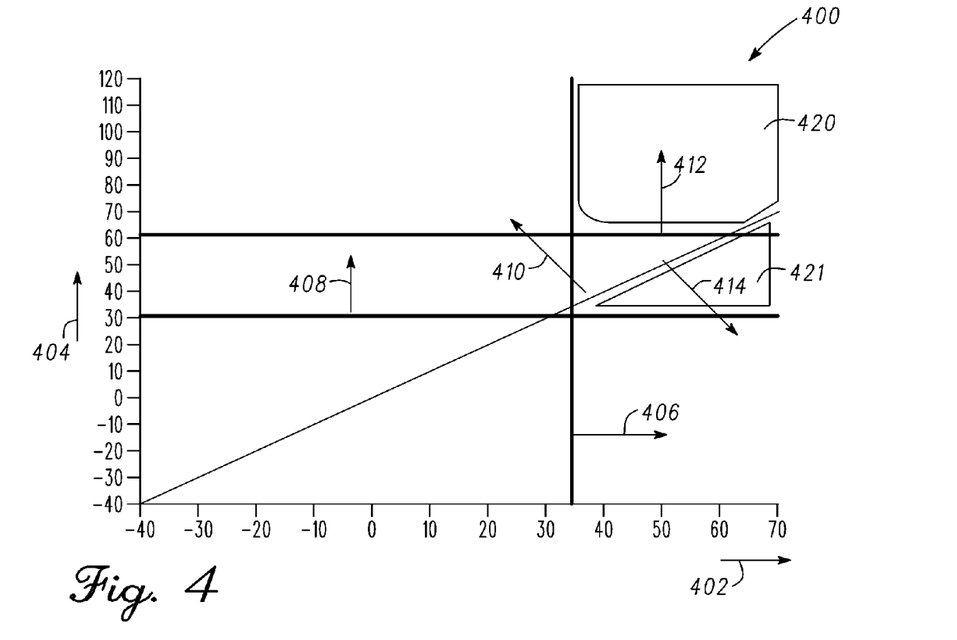
FIG. 4 is a graphical representation of exemplary temperature ranges for determining thermal control strategies for the process of FIGS. 2 and 3, in accordance with an exemplary embodiment.

FIG. 4 is a graphical representation 400 of exemplary temperature ranges for determining thermal control strategies for the process 200 (including the sub-process 225 thereof) of FIGS. 2 and 3, in accordance with an exemplary embodiment. In the embodiment of FIG. 4, the process 200 is used in a hybrid vehicle in which the element 104 of FIG. 1 comprises a fan, the first device 108 of FIG. 1 comprises a battery of the hybrid vehicle, and the additional devices 109 comprise power electronic devices of the hybrid vehicle (preferably the inverter 110 of FIG. 1 and the APM 112 of FIG. 1). In FIG. 4, the independent variable 402 is inlet air temperature (measured in Celsius degrees), and the dependent variables 404 are the temperatures (measured in Celsius degrees) of the battery 108 and the power electronic devices 109 of FIG. 1.

As shown in FIG. 4, when the inlet air temperature is greater than a predetermined inlet air temperature threshold (which is equal to approximately thirty five degrees Celsius (35° C.) in the depicted embodiment), a first condition 406 is satisfied. A second condition 408 is satisfied when the battery temperature is greater than a predetermined battery temperature threshold (which is equal to approximately thirty five degrees Celsius (35° C.) in the depicted embodiment). A third condition 410 is satisfied when at least one of the inverter temperature and/or the APM temperature is greater than the inlet air temperature. A fourth condition 412 is satisfied when at least one of the inverter temperature and/or the APM temperature is greater than its predetermined threshold. A fifth condition 414 is satisfied when the battery temperature is less than the inlet air temperature.

When each of the first, second, third, fourth, and fifth conditions 406-414 are satisfied, the determinations lie within both of regions 420 and 421 of FIG. 4, and the alternative control strategy of step 220 of FIGS. 1 and 2 is used to control operation of the element (for example, fan) 104 of FIG. 1 and to thereby control the temperature of the devices 106 of FIG. 1. Conversely, when one or more of the first, second, third, fourth, and/or fifth conditions 406-414 are not satisfied, the determinations lie outside one or both of regions 420 and 421 of FIG. 4, and the standard control strategy of step 222 of FIGS. 1 and 2 is instead used to control operation of the element (for example, fan) 104 of FIG. 1 and to thereby control the temperature of the devices 106 of FIG. 1.

Figure 5:
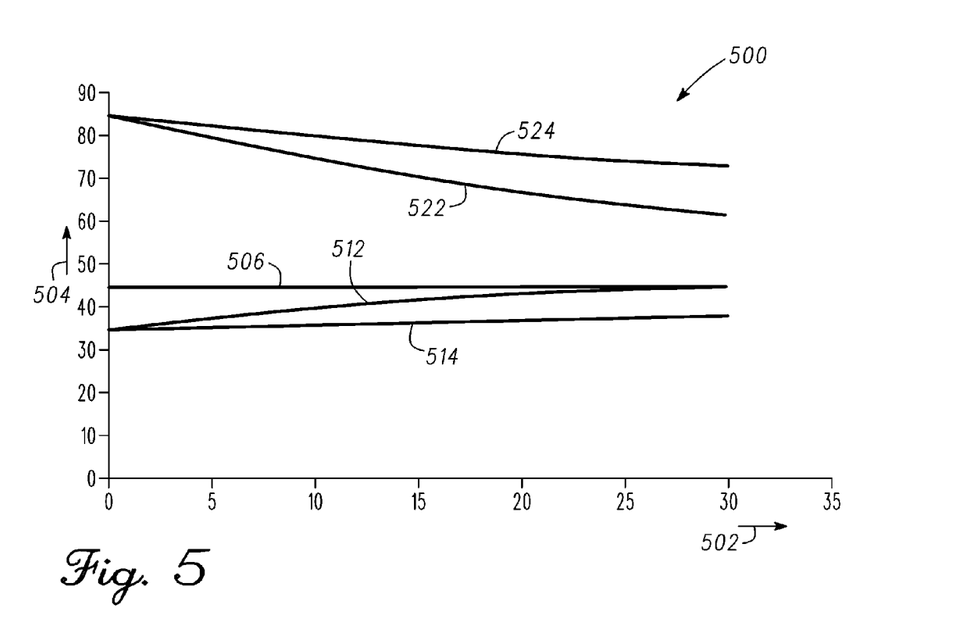
FIG. 5 is a graphical representation of the effects of the resulting thermal control of the thermal control strategies for the process of FIGS. 2 and 3, in accordance with an exemplary embodiment.

FIG. 5 is a graphical representation 500 of the effects of the resulting thermal control of the thermal control strategies for the process 200 (including the sub-process 225 thereof) of FIGS. 2 and 3 and consistent with the embodiment of FIG. 4, in accordance with an exemplary embodiment. In the embodiment of FIG. 5, the process 200 is used in a hybrid vehicle in which the element 104 of FIG. 1 comprises a fan, the first device 108 of FIG. 1 comprises a battery of the hybrid vehicle, and the additional devices 109 comprise power electronic devices of the hybrid vehicle (preferably the inverter 110 of FIG. 1 and the APM 112 of FIG. 1). In FIG. 5, the independent variable 502 is time (measured in minutes), and the dependent variables 504 are the various temperatures of the inlet air and the devices 106 of FIG. 1.

As shown in FIG. 5, an inlet air temperature 506 is considered to be constant while the process is performed. Using traditional thermal control techniques (for example, in which the highest fan speed requester is also given priority), a battery temperature 512 increases and approaches the inlet air temperature 506. However, using the process 200 of FIGS. 2 and 3 (and the values of FIG. 4), a battery temperature 514 increases relatively more slowly as compared with traditional thermal control techniques, and does not come as close to the inlet air temperature 506. As a result, the increase in battery temperature is reduced or minimized, thereby helping to enhance the operation, functionality, and lifespan of the battery. In addition, a power electronic device temperature 524 is reduced using the process 200 of FIGS. 2 and 3, albeit at a lesser rate than a power electronic device temperature 522 in accordance with traditional thermal control techniques.

Accordingly, improved methods, program products, and systems are provided. The improved methods, program products, and systems provide for improved thermal control of multiple devices using a single element. Different temperature ranges or boundary conditions are utilized for the different devices in order to provide an optimized overall solution for the control of the temperature of the various devices in the system. In one preferred embodiment utilized in a hybrid vehicle, the methods, program products, and systems provide, in appropriate situations, adjusted temperature adjustments for power electronic devices when of the hybrid vehicle with a reduced or minimized impact on a battery of the hybrid vehicle, for example in situations in which the power electronic devices require cooling, and in which the battery does not require cooling but is in a safe and reasonable operating range in which a relatively modest change in temperature can be tolerated.

It will be appreciated that the disclosed methods and systems may vary from those depicted in the Figures and described herein. For example, as mentioned above, the controller 122 of FIG. 1 may be disposed in whole or in part in any one or more of a number of different vehicle units, devices, and/or systems. In addition, it will be appreciated that certain steps of the process 200, the sub-process 225 thereof, and/or the graphical representations pertaining thereto may vary from those depicted in FIGS. 2-5 and/or described above in connection therewith. It will similarly be appreciated that certain steps of the process 200 and/or the sub-process 225 thereof may occur simultaneously or in a different order than that depicted in FIGS. 2 and 3 and/or described above in connection therewith. It will similarly be appreciated that the disclosed methods and systems may be implemented and/or utilized in connection with any number of different types of automobiles, sedans, sport utility vehicles, trucks, any of a number of other different types of vehicles, and/or any number of other different types of devices and/or systems.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing the exemplary embodiment or exemplary embodiments. It should be understood that various changes can be made in the function and arrangement of elements without departing from the scope of the invention as set forth in the appended claims and the legal equivalents thereof.

We claim:

1. A method for thermally controlling a plurality of devices of a system using a thermal control element, wherein the system is disposed within a vehicle, the method comprising the steps of:

controlling the thermal control element with a processor in accordance with a first control strategy if each of a plurality of conditions are met, based at least in part on (a) a first comparison between a temperature of a first device of the plurality of devices and a first predetermined threshold, the first device comprising a battery of the vehicle, (b) a second comparison between an inlet temperature of the system and a second predetermined threshold, (c) a third comparison between the inlet temperature and the temperature of the first device, (d) if a temperature of a second device of the plurality of devices is greater than a third predetermined threshold, wherein the second device comprises an inverter or accessory power module of the vehicle, and (e) if the inlet temperature is less than the temperature of the second device; and controlling the thermal control element via the processor in accordance with a second control strategy via the processor if any of the plurality of conditions are not met.

2. The method of claim 1, wherein:

the step of controlling the thermal control element in accordance with the first control strategy comprises the step of controlling the thermal control element in accordance with the first control strategy if each of the following conditions is satisfied; namely: (a) the temperature of the first device is greater than the first predetermined threshold, (b) the inlet temperature is greater than the second predetermined threshold, (c) the inlet temperature is greater than the temperature of the first device, (d) the temperature of the second device is greater than the third predetermined threshold, and (e) the inlet temperature is less than the temperature of the second device; and the step of controlling the thermal control element in accordance with the second control strategy comprises the step of controlling the thermal control element in accordance with the second control strategy if any of conditions (a)-(e) are not satisfied.

3. The method of claim 1, wherein:
the step of controlling the thermal control element in accordance with the first control strategy comprises the step of controlling the thermal control element in accordance with the first control strategy if each of the following conditions (a)-(e) are satisfied; namely: (a) the temperature of the first device is less than the first predetermined threshold, (b) the inlet temperature is less than the second predetermined threshold, (c) the inlet temperature is less than the temperature of the first device, (d) the temperature of the second device is greater than the third predetermined threshold, and (e) the inlet temperature is less than the temperature of the second device; and the step of controlling the thermal control element in accordance with the second control strategy comprises the step of controlling the thermal control element in accordance with the second control strategy if any of conditions (a)-(e) are not satisfied.

4. The method of claim 1, wherein:
the thermal control element comprises a fan;
the first control strategy adjusts a speed of the fan at a first rate; and
the second control strategy adjusts the speed of the fan at a second rate that is greater than the first rate.

5. The method of claim 1, wherein:
the plurality of devices further comprises a third device; and
the plurality of conditions are based at least in part on a temperature of the third device in addition to the temperature of the first device and the temperature of the second device.

6. The method of claim 5, wherein:
the system is disposed within a hybrid vehicle;
the thermal control element comprises a fan;
the second device comprises the inverter of the hybrid vehicle; and
the third device comprises the accessory power module of the hybrid vehicle.

7. The method of claim 1, wherein the plurality of conditions comprises the following: (1) the temperature of the first device is within a first predetermined range, (2) the temperature of the second device is within a second predetermined range, and (3) the inlet temperature is within a third predetermined range.

8. The method of claim 1, wherein the vehicle comprises a hybrid vehicle.

9. The method of claim 1, wherein the thermal control element comprises a fan.

10. A program product for thermally controlling a plurality of devices of a system using a thermal control element, wherein the system is disposed within a vehicle, the program product comprising:
a program configured to:
control the thermal control element in accordance with a first control strategy if each of a plurality of conditions are met, based at least in part on (a) a first comparison between a temperature of a first device of the plurality of devices and a first predetermined threshold, the first device comprising a battery of the vehicle, (b) a second comparison between an inlet temperature of the system and a second predetermined threshold, (c) a third comparison between the inlet temperature and the temperature of the first device, (d) if a temperature of a second device of the plurality of devices is greater than a third predetermined threshold, wherein the second device comprises an inverter or accessory power module of the vehicle, and (e) if the inlet temperature is less than the temperature of the second device; and
control the thermal control element in accordance with a second control strategy if any of the plurality of conditions are not met; and
a non-transitory computer readable storage medium storing the program.

11. The program product of claim 10, wherein the program is further configured to:
control the thermal control element in accordance with the first control strategy if each of the following conditions is satisfied; namely: (a) the temperature of the first device is greater than the first predetermined threshold, (b) the inlet temperature is greater than the second predetermined threshold, (c) the inlet temperature is greater than the temperature of the first device, (d) the temperature of the second device is greater than the third predetermined threshold, and (e) the inlet temperature is less than the temperature of the second device; and
control the thermal control element in accordance with the second control strategy if any of conditions (a)-(e) are not satisfied.

12. The program product of claim 10, wherein the program is further configured to:
control the thermal control element in accordance with the first control strategy if each of the following conditions (a)-(e) are satisfied; namely: (a) the temperature of the first device is less than the first predetermined threshold, (b) the inlet temperature is less than the second predetermined threshold, (c) the inlet temperature is less than the temperature of the first device, (d) the temperature of the second device is greater than the third predetermined threshold, and (e) the inlet temperature is less than the temperature of the second device; and
control the thermal control element in accordance with the second control strategy if any of conditions (a)-(e) are not satisfied.

13. A system for thermally controlling a plurality of devices of a second system using a thermal control element, the plurality of devices of the second system including a first device and a second device, wherein the second system is disposed within a vehicle, the system comprising:
a first sensor configured to measure a temperature of a first device of the plurality of devices, the first device comprising a battery of the vehicle;
a second sensor configured to measure a temperature of a second device of the plurality of devices, the second device comprising an inverter or accessory power module of the vehicle;
a third sensor configured to measure an inlet temperature of the second system; and
a processor coupled to the first sensor, the second sensor, and the third sensor, the processor configured to:
control the thermal control element in accordance with a first control strategy if each of a plurality of conditions are met, based at least in part on (a) a first comparison between the temperature of the first device and a first predetermined threshold, (b) a second comparison between the inlet temperature and a second predetermined threshold, (c) a third comparison between the inlet temperature and the temperature of the first device, (d) if the temperature of the second device is greater than a third predetermined threshold, and (e) if the inlet temperature is less than the temperature of the second device; and control the thermal control element in accordance with a second control strategy if any of the plurality of conditions are not met.

14. The system of claim 13, wherein the processor is further configured to:

control the thermal control element in accordance with the first control strategy if each of the following conditions is satisfied; namely: (a) the temperature of the first device is greater than the first predetermined threshold, (b) the inlet temperature is greater than the second predetermined threshold, (c) the inlet temperature is greater than the temperature of the first device, (d) the temperature of the second device is greater than the third predetermined threshold, and (e) the inlet temperature is less than the temperature of the second device; and control the thermal control element in accordance with the second control strategy if any of conditions (a)-(e) are not satisfied.

15. The system of claim 13, wherein the processor is further configured to:

control the thermal control element in accordance with the first control strategy if each of the following conditions (a)-(e) are satisfied; namely: (a) the temperature of the first device is less than the first predetermined threshold, (b) the inlet temperature is less than the second predetermined threshold, (c) the inlet temperature is less than the temperature of the first device, (d) the temperature of the second device is greater than the third predetermined threshold, and (e) the inlet temperature is less than the temperature of the second device; and control the thermal control element in accordance with the second control strategy if any of conditions (a)-(e) are not satisfied.

16. The system of claim 13, wherein:
the thermal control element comprises a fan;
the first control strategy adjusts a speed of the fan at a first rate; and
the second control strategy adjusts the speed of the fan at a second rate that is greater than the first rate.

17. The system of claim 13, wherein the plurality of devices of the second system also includes a third device, and the plurality of conditions are based at least in part on a temperature of the third device in addition to the temperature of the first device and the temperature of the second device.

18. The system of claim 17, wherein:
the second system is disposed within a hybrid vehicle;
the thermal control element comprises a fan;
the second device comprises the inverter of the hybrid vehicle; and
the third device comprises the accessory power module of the hybrid vehicle.

19. The system of claim 13, wherein the vehicle comprises a hybrid vehicle.

20. The system of claim 13, wherein the thermal control element comprises a fan.

* * * * *